United States Patent
Smith, Jr. et al.

(10) Patent No.: US 7,255,777 B2
(45) Date of Patent: Aug. 14, 2007

(54) DISTILLATION SYSTEM

(75) Inventors: Lawrence A. Smith, Jr., Houston, TX (US); Gary R. Gildert, Houston, TX (US); James R. Fair, Austin, TX (US); A. Frank Seibert, Austin, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 0 days.

(21) Appl. No.: 11/207,147

(22) Filed: Aug. 19, 2005

(65) Prior Publication Data

US 2005/0279622 A1      Dec. 22, 2005

Related U.S. Application Data

(63) Continuation of application No. 10/300,505, filed on Nov. 20, 2002, now abandoned.

(60) Provisional application No. 60/364,950, filed on Mar. 15, 2002.

(51) Int. Cl.
*B01D 3/14* (2006.01)
*B01D 3/32* (2006.01)
*B01D 3/42* (2006.01)

(52) U.S. Cl. .............. 203/1; 202/158; 203/2; 203/29; 203/41; 203/DIG. 6; 422/190; 585/800

(58) Field of Classification Search ............ 203/1, 203/2, 29, 38, 41, DIG. 6; 202/158; 422/190; 261/128, 154, DIG. 72; 585/800, 803, 804
See application file for complete search history.

(56) References Cited

U.S. PATENT DOCUMENTS

| | | | |
|---|---|---|---|
| 3,809,375 A | 5/1974 | Bonnet | 261/87 |
| 4,201,736 A | 5/1980 | Ellis et al. | 261/98 |
| 4,361,469 A | 11/1982 | Trutna | 203/99 |
| 4,439,350 A | 3/1984 | Jones, Jr. | 502/527 |
| 4,443,559 A | 4/1984 | Smith, Jr. | 502/527 |
| 4,929,399 A | 5/1990 | Lockett et al. | 261/112.2 |

(Continued)

OTHER PUBLICATIONS

Arthur and Elizabeth Rose, Arthur L. Glasebrook, F.E. Williams, Carl S. Carlson, John R. Bowman, R. Stuart Tipson, Edmond S. Perry, John C. Hecker, Distillation, Technique of Organic Chemistry, vol. IV, Interscience Publisher, Inc. New York, 1951.

(Continued)

*Primary Examiner*—Virginia Manoharan
(74) *Attorney, Agent, or Firm*—Osha Liang, LLP (57) ABSTRACT

Improved HETP is obtained in the operation of a distillation column containing trays with a packing of a porous container containing a particulate material intimately associated with a resilient component having at least 50 volume % open space, preferably at least 70 volume % positioned on the trays compared to the trays without the packing. The packing may contain a catalytic particulate material and the distillation may involve reaction and distillation of the reaction products. The particulate material may also be inert and the distillation of the conventional type to separate components in the distillation mixture without reaction.

6 Claims, 2 Drawing Sheets

U.S. PATENT DOCUMENTS

| | | | |
|---|---|---|---|
| 5,262,094 A | 11/1993 | Chuang et al. | 261/97 |
| 5,266,546 A | 11/1993 | Hearn | 502/300 |
| 5,855,741 A | 1/1999 | Koch et al. | 202/158 |
| 5,954,924 A | 9/1999 | Art | 203/1 |
| 6,045,762 A | 4/2000 | Chuang et al. | 422/195 |
| 6,357,728 B1 | 3/2002 | Sunder et al. | 261/112.2 |
| 6,513,795 B2 | 2/2003 | Sunder | 261/94 |
| 6,762,334 B1 | 7/2004 | Stewart et al. | 585/323 |
| 2004/0211725 A1* | 10/2004 | Jansen et al. | 210/640 |

OTHER PUBLICATIONS

Prof. R. Krishna, Chemical Reactor Engineering, Department of Chemical Engineering, from the internet on Jul. 28, 2002 @ http://www-its.chem.uva.nl/annual_reports/jaarverslag 00/CRE.htm.

Arthur and Elizabeth Rose, et al., Distillation, Technique of Organic Chemistry, vol. IV, Interscience Publisher, Inc., New York, 1951.

Prof R. Krishna, Chemical Reactor Engineering, Dept. of Chem. Eng., from the Internet on Jul. 2, 2002 @ http://www-its.chem.uva.nl/annual_reports/jaarverslag 00/CRE.htm.

* cited by examiner

DISTILLATION SYSTEM

This is a continuation of application Ser. No. 10/300,505 filed on Nov. 20, 2002, now abandoned, which claims the benefit of U.S. Provisional Application No. 60/364,950, filed Mar. 15, 2002.

BACKGROUND OF THE INVENTION

1. Field of the Invention

The present invention relates to a system for concurrently carrying out distillation or chemical reactions and separating the reactants and products by fractional distillation.

2. Related Art

A method of carrying out catalytic reactions has been developed and widely commercialized, wherein the components of the reaction mixture are concurrently separable by fractional distillation. Several systems have been proposed and one commercially successful system uses the catalyst as the catalytic distillation structure. Such a system is variously described in U.S. Pat. Nos. 4,215,011; 4,232,177; 4,242,530; 4,250,052; 4,302,356; 4,307,254; 4,336,407; 4,439,350; 4,443,559; and 4,482,775 commonly assigned herewith.

Briefly, the commercial catalytic structure described therein comprises a cloth belt with a plurality of pockets spaced along the belt and containing particulate catalyst material. The cloth belt with catalyst filled pockets is wound into a helix about a spacing material such as knitted stainless steel wire mesh, and these "bales" loaded into a distillation column. Additionally U.S. Pat. Nos. 4,302,356, 4,443,559 and 4,250,052 disclose a variety of catalyst structures for this use.

Placing the particulate catalyst loose on standard distillation trays has also been proposed. See, for example, U.S. Pat. No. 4,215,011 and U.K. patents GB 2,096,603 and 2,096,604. U.S. Pat. No. 4,439,350 discloses a clip which holds and supports closed porous containers of catalyst spaced apart from each other on a distillation tray within the liquid on the tray. The placement of the catalyst in the downcomers of standard distillation columns has been proposed as in U.S. Pat. No. 3,634,534. Fluidization of the catalyst on the trays has also been suggested as in U.S. Pat. No. 4,471,154. Some deficiencies of such fluidized beds were recognized in Chemiker Zeitung/Chemische Apparatur, vol. 90, no. 13, July 1966 and U.S. Pat. No. 4,215,011. Quang, et al, in U.S. Pat. No. 4,847,430 and Nocca, et al in U.S. Pat. No. 4,847,431 disclose loading the particulate catalyst on alternating trays of a distillation column and with a gas bypass about the catalyst loaded trays. The use of solid glass beads to disperse and support a catalyst in a fixed bed has long been used, especially in pilot plants and bench scale reactors. See for example U.S. Pat. No. 4,918,244 wherein glass beads were used as a dispersant and support in a bench scale reactor distillation column. So far, one of the most commercially successful arrangements has been to the place the particulate catalyst in closed pockets disposed along a fiber glass cloth belt as disclosed in U.S. Pat. No. 4,215,011.

The main problems sought to be overcome by the improvements have been the reduction of pressure drop through the column and provision of sufficient contact of the reactants with the catalyst while providing for good vapor liquid contact for the fractional distillation. Many useful catalysts are in the form of fine particulate powders which preclude their use directly as distillation components. Even larger extruded pellets do not lend themselves well as distillation structures. Hence the use of cloth belts, cages and support trays is the predominant developmental thrust.

While larger catalysts structures have been proposed, the porosity requirements of many catalytic materials limit their structural integrity. Many catalysts which rely on outer surface activity only and which might have the strength for larger structures are useful only for gas phase reactions, such as maleic anhydride production. U.S. Pat. Nos. 4,443,559 and 5,266,546 both disclose catalytic distillation structures that may be placed on trays similar to sieve trays for support in a distillation column reactor.

The present invention is related to these structures and catalytic distillation, but it is also related to distillation in general. It is an advantage of the present invention that greater tower efficiency may be obtained for conventional distillation trays by use of the present system. No art is known to suggest the present invention and in fact conventional knowledge would suggest the present invention would be counterproductive. The unexpected benefit of the present invention will be obvious from the disclosures herein.

SUMMARY OF THE INVENTION

Surprisingly it has been found that in the operation of a distillation column containing a plurality of trays is improved by positioning on said trays a packing comprising a porous container containing a particulate material intimately associated with a spacing component, said spacing component being comprised of at least 50 volume % open space in an amount to provide height equivalent to theoretical plates (HETP) of less than said trays without said packing wherein the spacing component may be resilient or rigid. In a preferred embodiment the packing comprises a porous container containing a particulate material intimately associated with a resilient component, said resilient component being comprised of at least 50 volume % open space, preferably at least 70 volume % and positioned on trays provides height equivalent to theoretical plates (HETP) of less than said trays without said packing. The packing may contain a catalytic particulate material and the distillation may involve reaction and distillation of the reaction products. The particulate material may also be inert and the distillation of the conventional type to separate components in the distillation mixture without reaction.

The tray may be any of the conventional trays (or modifications thereof), such as sieve trays and bubble trays.

DESCRIPTION OF THE PREFERRED EMBODIMENT

The present packing may fill the entire space between the trays or only so much of the area so as to obtain the benefit of the lower HETP. The packed trays may have lower capacity than the non packed trays. The limitation on the non packed trays (as used in conventional distillation) is the liquid entrainment, whereas it appears that downcomer capacity is a limitation on the capacity for the present packed trays. Hydraulic calculation indicates the throughput limitation that the downcomer backup is likely to impose on the packed trays. The equivalent clear liquid level in the downcomer must balance the vapor flow pressure drop as follows:

$$h_{dc} - h_{da} = h_d + 2h_L$$

where $h_{dc}$=head of froth in the downcomer, equivalent clear liquid.

$h_{da}$=pressure loss for liquid flow under the downcomer baffle.

$h_d$=pressure loss for flow through one tray.

$h_L$=pressure loss for the two-phase flow through packing.

In this relationship, head can be expressed as clear liquid or as equivalent water. the value of $h_L$ is obtained from overall tray pressure drop measurements.

It has been observed that in a catalyst bed a free space of about 50 volume percent is adequate to obtain operable fractionation.

The particulate material may be employed by enclosing it in a porous container such as cloth, screen wire or polymeric mesh. The material used to make the container must be inert to the reactants and conditions in the distillation or reaction/distillation system. The cloth may be any material which meets this requirement such as cotton, fiber glass, polyester, nylon and the like. The screen wire may be aluminum, steel, stainless steel and the like. The polymer mesh may be nylon, teflon or the like. The mesh or threads per inch of the material used to make the container is such that the particulate material is retained therein and will not pass through the openings. Particles of about 0.15 mm size or powders may be used and particles up to about ¼ inch diameter may be employed in the containers.

The container employed to hold the catalyst particles may have any configuration, such as the pockets disclosed in the commonly assigned patents above or the container may be a single cylinder, sphere, doughnut, cube, tube or the like.

Each container containing a solid particulate material (inert or catalytic) comprises a particulate component. Each particulate component is intimately associated with a spacing component which is comprised of at least 70 volume % open space up to about 95 volume % open space. This component may be rigid or resilient or a combination thereof. The combination of catalyst component and spacing component form the catalytic distillation structure. One suitable such material is open mesh knitted stainless wire, known generally as demister wire or an expanded aluminum. Other resilient components may be similar open mesh knitted polymeric filaments of nylon, teflon and the like. It is only necessary that the spacing component intimately associated with the catalyst component will act to space the various catalyst components away from one another as described above. Thus, the spacing component provides in effect a matrix of substantially open space in which the catalyst components are randomly but substantially evenly distributed.

Rigid or non resilient spacing components are disclosed in U.S. Pat. No. 5,730,843 (which is incorporated herein in its entirety) where a rigid frame comprised of at least two substantially vertical duplicate grids, a plurality of substantially horizontal rigid members spacing and holding the grids apart and a plurality of substantially horizontal fluid permeable, preferably wire mesh, tubes mounted to said grids to form a plurality of fluid pathways among said tubes and preferably at least a portion of said wire mesh tubes contain a particulate material.

The container may cloth or other porous material which is inert in the environment of use. Cotton or linen is useful: but fiber glass cloth or "Teflon" cloth is preferred as is wire mesh. The particulate material may be powder, but is generally larger, e.g. from 0.25 to 1 mm with larger particles up to ¼" also being used.

The packing surface efficiency is high. Importantly, the liquid appears to flow through the cloth wall (it is forced to do so) which may provide better penetration of catalyst particles than would be obtained in conventional counterflow.

Figure 2:
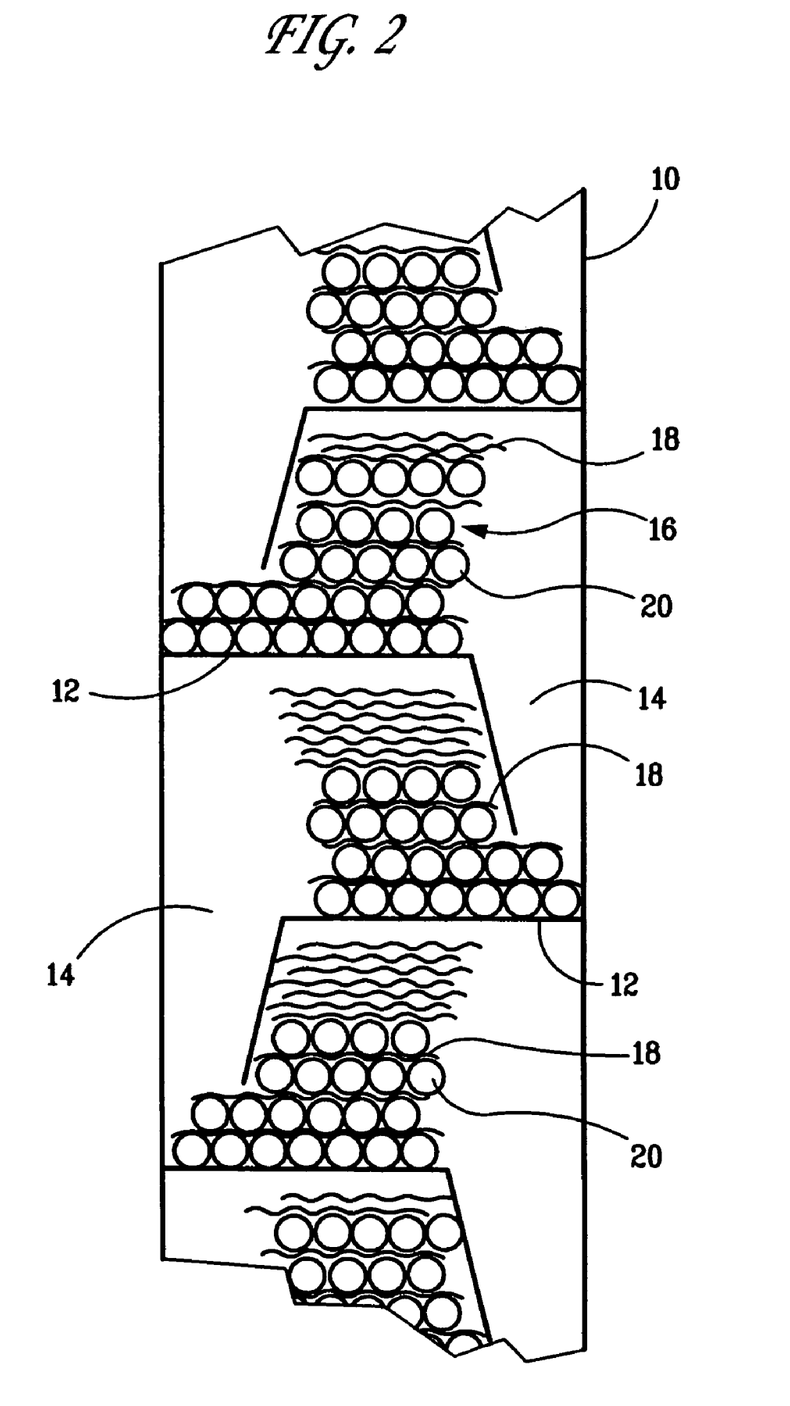
FIG. 2 is a schematic representation of a partial section of a distillation with the packing in place.

Referring to FIG. 2 a partial column 10 is shown with sieve trays 12 and downcomers 14. Between each tray the packing 16, comprising the particle containers 20 and demister wire 18. The packing 16 is arranged under the downcomer to the tray but leaving the downcomer from the tray on which it sits to remain open. In this embodiment the last few inches of space is filled with demister wire.

EXAMPLE

Figure 1:
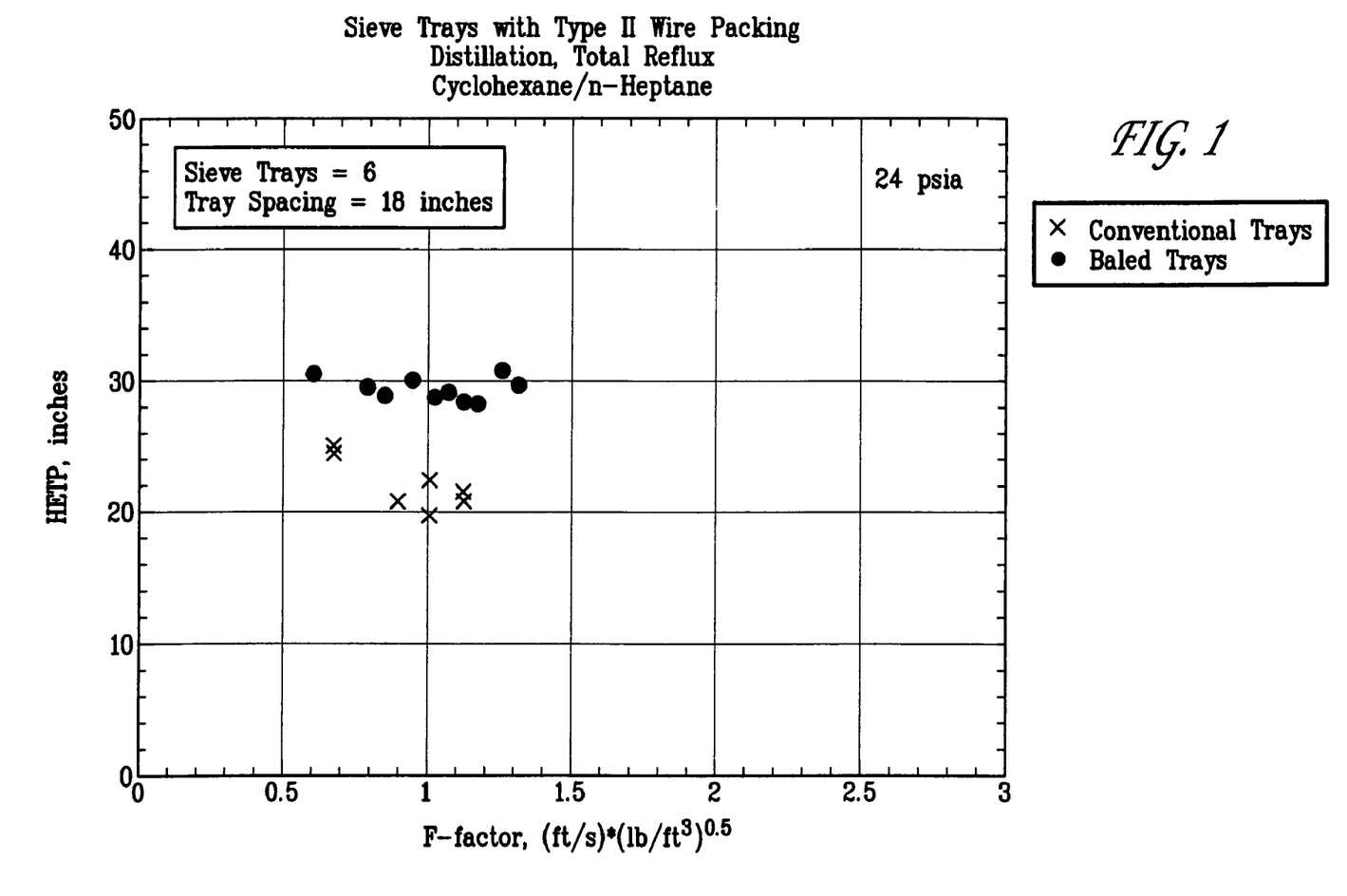
FIG. 1 is a graph showing improved HETP in inches for the present packed tray column compared to the same tray column without the packing.

The data for FIG. 1 was obtained using a column having 6 sieve trays spaced at 18 inches at 24 psia of the separation of a cyclohexane/n-heptane mixture under total reflux. The packing is formed by placing multiple link or continuous tube shaped structures on top of a wire mesh screen, such as demister wire. The tube comprises flexible, semi-rigid wire mesh tubular element filled with a particulate catalytic material the tube shaped structure having a fastener every 1-12 inches in length to form a multiple link looking like a chain of screen wire sausages. The packing is that described in U.S. Pat. No. 5,431,890 unrolled and packed in between each tray with demister wire between each layer of the tubing, providing alternating layers of demister wire and close placed tubes of catalyst. The entire space between the trays was packed in this manner, with at least the demister wire going to the tray above, The space over the downcomers was left open to allow liquid to disengage from the packing, The fractionating factor for the packed trays is substantially the same as the sieve trays alone.

The invention claimed is:

1. In the process of operating a distillation column containing a plurality of trays and downcomers associated therewith wherein the improvement comprises positioning on said trays a packing comprising a porous container containing a particulate material intimately associated with a spacing component, said spacing component being comprised of at least 70 volume % up to about 95 volume % open space, said packing being present in said distillation column in an amount to provide height equivalent to theoretical plates (HETP) of less than the HETP of said trays in the absence of said packing and an equivalent clear liquid level in a downcomer associated with a tray must balance the vapor flow pressure drop as follows:

$$h_{dc} - h_{da} = h_d + 2h_L$$

where $h_{dc}$=head of froth in the downcomer, equivalent clear liquid, $h_{da}$=pressure loss for liquid flow under a downcomer baffle, $h_d$=pressure loss for flow through one tray, and $h_L$=pressure loss for the two-phase flow through said packing.

2. The process according to claim 1 wherein said particulate material comprises a catalytic particulate material and the process invokes reaction and distillation of reaction products.

3. The process according to claim 1 wherein said particulate material comprises inert material and the process is for separation of components in a distillation mixture without reaction.

4. The process according to claim 1 wherein said particulate material comprises catalytic particulate material and the process is for the separation of components in a distillation mixture with reaction.

5. The process according to claim 1 wherein the spacing component is resilient.

6. The precess according to claim 1 wherein the spacing component is rigid.

* * * * *

UNITED STATES PATENT AND TRADEMARK OFFICE
CERTIFICATE OF CORRECTION

PATENT NO. : 7,255,777 B2
APPLICATION NO. : 11/207147
DATED : August 14, 2007
INVENTOR(S) : Lawrence A. Smith, Jr. et al.

It is certified that error appears in the above-identified patent and that said Letters Patent is hereby corrected as shown below:

In Claim 2, column 5, line 1, the word "invokes" should be --involves--.

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,255,777 B2  Page 1 of 3
APPLICATION NO. : 11/207147
DATED : August 14, 2007
INVENTOR(S) : Lawrence A. Smith, Jr. et al.

It is certified that error appears in the above-identified patent and that said Letters Patent is hereby corrected as shown below:

The Title Page, showing an illustrative Figure, should be deleted and substitute therefor the attached Title Page In the Drawings:

Figure 1 is replaced with a corrected Figure 1 with the following change as attached:

The legend is corrected as follows:

From:
| X Conventional Trays |
| • Baled Trays |

To:
| • Conventional Trays |
| X Baled Trays |

Signed and Sealed this

Seventeenth Day of August, 2010

David J. Kappos
*Director of the United States Patent and Trademark Office*

(12) United States Patent
Smith, Jr. et al.

(10) Patent No.: US 7,255,777 B2
(45) Date of Patent: Aug. 14, 2007

(54) DISTILLATION SYSTEM (75) Inventors: Lawrence A. Smith, Jr., Houston, TX (US); Gary R. Gildert, Houston, TX (US); James R. Fair, Austin, TX (US); A. Frank Seibert, Austin, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 0 days.

(21) Appl. No.: 11/207,147

(22) Filed: Aug. 19, 2005

(65) Prior Publication Data
US 2005/0279622 A1 Dec. 22, 2005

Related U.S. Application Data (63) Continuation of application No. 10/300,505, filed on Nov. 20, 2002, now abandoned.

(60) Provisional application No. 60/364,950, filed on Mar. 15, 2002.

(51) Int. Cl.
B01D 3/14 (2006.01)
B01D 3/32 (2006.01)
B01D 3/42 (2006.01)

(52) U.S. Cl. ............... 203/1; 202/158; 203/2; 203/29; 203/41; 203/DIG. 6; 422/190; 585/800

(58) Field of Classification Search ............ 203/1, 203/2, 29, 38, 41, DIG. 6; 202/158; 422/190; 261/128, 154, DIG. 72; 585/800, 803, 804
See application file for complete search history.

(56) References Cited

U.S. PATENT DOCUMENTS

| 3,809,375 | A | 5/1974 | Bonnet | 261/87 |
| 4,201,736 | A | 5/1980 | Ellis et al. | 261/98 |
| 4,361,469 | A | 11/1982 | Trutna | 203/99 |
| 4,439,350 | A | 3/1984 | Jones, Jr. | 502/527 |
| 4,443,559 | A | 4/1984 | Smith, Jr. | 502/527 |
| 4,929,399 | A | 5/1990 | Lockett et al. | 261/112.2 |

(Continued)

OTHER PUBLICATIONS

Arthur and Elizabeth Rose, Arthur L. Glasebrook, F.E. Williams, Carl S. Carlson, John R. Bowman, R. Stuart Tipson, Edmond S. Perry, John C. Hecker, Distillation, Technique of Organic Chemistry, vol. IV, Interscience Publisher, Inc. New York, 1951.

(Continued)

*Primary Examiner*—Virginia Manoharan
(74) *Attorney, Agent, or Firm*—Osha Liang, LLP (57) ABSTRACT Improved HETP is obtained in the operation of a distillation column containing trays with a packing of a porous container containing a particulate material intimately associated with a resilient component having at least 50 volume % open space, preferably at least 70 volume % positioned on the trays compared to the trays without the packing. The packing may contain a catalytic particulate material and the distillation may involve reaction and distillation of the reaction products. The particulate material may also be inert and the distillation of the conventional type to separate components in the distillation mixture without reaction.

6 Claims, 2 Drawing Sheets